United States Patent Office 3,027,229
Patented Mar. 27, 1962

3,027,229
METHOD OF PREPARING HYDRATED CALCIUM PHOSPHATE GELS
John P. Towey, Teunis Van Wyke, Karl A. Ratcliff, and William A. Dorrance, all of Des Moines, Iowa, assignors, by mesne assignments, to Diamond Laboratories, Des Moines, Iowa, a limited partnership
No Drawing. Original application Dec. 2, 1957, Ser. No. 699,951, now Patent No. 2,967,802, dated Jan. 10, 1961. Divided and this application Jan. 27, 1960, Ser. No. 9,666
6 Claims. (Cl. 23—109)

This application is a division of our copending application, Serial No. 699,951, filed December 2, 1957, now Patent 2,967,802 of January 10, 1961, and is entitled to the filing date thereof.

This invention relates to a gel of a salt of an alkaline earth metal and to novel uses thereof.

It is an object of the present invention to prepare novel gels of salts of alkaline earth metals.

A more specific object is to prepare a novel calcium phosphate gel.

A further object is to prepare novel immunological compositions, such as those possessing antigenic properties.

Yet another object is to prepare novel pellet implants.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

According to the invention there is prepared a gel of a salt of an alkaline earth metal. The gel so prepared has various uses; thus it has sorptive properties whereby it can be used to concentrate proteins and antigens. It can also be used as a tablet disintegrator, as a suspending agent, as a clarifying agent, as an immunological adjuvant, as a flocculating agent and as an oral detoxifying antiacid.

The gels are prepared by admixing an acid solution of an alkaline earth metal with an aqueous alkaline solution of phosphate in a colloidal state. As the alkaline earth metal compounds there may be mentioned organic and inorganic salts of magnesium, calcium, barium and strontium completely dissolved in an acid medium.

Typical starting compounds include magnesium carbonate, calcium carbonate, calcium chloride, magnesium chloride, barium chloride, strontium chloride, calcium acetate, calcium lactate, calcium gluconate, barium lactate, magnesium acetate; calcium propionate and calcium nitrate.

The preferred starting materials are the calcium salts. For best results in obtaining a pure compound calcium carbonate is then dissolved in an acid solution, e.g., lactic acid, hydrochloric acid, acetic acid, malic acid, fumaric acid, formic acid, nitric acid. At least the theoretical amount of acid should be used to dissolve the calcium carbonate. In order to hasten the dissolution an excess of acid, e.g., 10%, is preferably employed.

To the calcium or other alkaline earth metal salt there is then added rapidly and with stirring aqueous ammonium phosphate in the presence of excess ammonia, e.g., sufficient to insure complete conversion of the

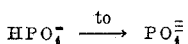

thus reducing possibility of $CaHPO_4$ formation. The pH preferably is not less than 9.1. This results in the formation of the gel. Sodium hydroxide or potassium hydroxide may be employed in place of ammonia.

The preferred novel gel of the instant invention is pure hydrated calcium phosphate of the formula.

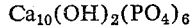

Tribasic calcium phosphate as normally prepared contains a mixture represented by the formula

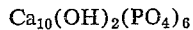

together with adsorbed calcium and/or phosphate ions and contaminated with a variable quantity of $CaHPO_4$. There is also present carbonates formed as a byproduct in the manufacture of the tribasic calcium phosphate. These impurities, and especially the $CaHPO_4$ and carbonates markedly alter the physical and colloidal properties of the freshly manufactured material and it is due to their absence that the hydrated calcium phosphate of the instant invention has its unusual and unique properties.

The over-all chemical equation for the synthesis of the gel of the present invention can be represented as follows:

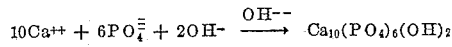

For best results the calcium compound and the phosphate should be used substantially in the amounts indicated by the equation, namely, 10 mols of calcium to 6 mols of phosphate.

Example 1

The product has an affinity for many organic and/or biological materials, for example, proteins, dyestuffs, and nitrogenous substances in general. It can be used to concentrate antigens including both proteantigens and other antigens.

(1) One thousand grams (10 mols) of pure calcium carbonate were dissolved in 2350 grams of 85% lactic acid (22 mols, i.e., theoretical quantity+10%) (U.S.P.) in 7.5 gallons of distilled water. The carbon dioxide formed was removed by boiling and the solution was mixed well.

(2) In a separate vessel 690 grams (6 mols of anhydrous $H_3PO_4$) of phosphoric acid (N.F. 85%) was dissolved in 7.5 gallons of distilled water. There was added 1790 cc. of aqueous ammonium hydroxide solution (28%) and the combination was well mixed. pH at this step is approximately 9.1. Eighteen mols of ammonia are required to convert the 6 mols of phosphoric acid to triammonium phosphate and the excess ammonia is needed to insure complete formation of $PO_4$ with a minimum of $HPO_4$.

(3) Then the basic ammonium phosphate solution was added rapidly with rapid stirring to the calcium lactate solution, or admixed simultaneously, and the resulting suspension allowed to stand overnight, or for 18 to 24 hours.

The supernatant liquid was decanted and the suspension filtered mechanically. The cake was washed four times with 7 to 10 gallons of distilled water. The final wash water was ammonia free as shown by Nessler's reagent. The cake was not allowed to dry during washing. Then the cake was placed in a calibrated container and brought to 5 gallons with distilled water and mixed well.

The above procedure produced a gel containing 935 grams dried solids (4.675% solids) and amounted to a yield of 93.5%. The gel had an acid combining power per gram of ignited material of 11.36 cc. of N/1 HCl; an ash of 4.37% and loss on ignition of 6.5%.

The equations for the reactions in steps 1, 2 and 3 are as follows:

(1)
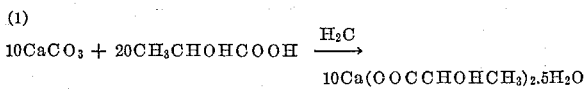

(2)
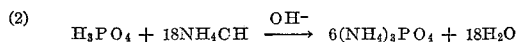

(3)
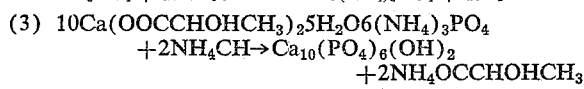

If the gel is to be stored for 3 days or longer ¼% formalin solution should be added as a preservative. In place of formalin other preservative such as phenol or chlorobutanol can be used.

The concentration of solids in the gel can be varied. The gel can contain as much as 15% solids but is usually more dilute.

For use as a protein concentrating medium the solids are normally diluted from 2 to 5%.

In a specific example of use as a protein concentrating medium the following procedure was employed:

*Example 2*

Media of proper concentration of nutrients specifically was prepared and sterilized. The media was inoculated with inoculum containing a pure culture of *Erysipelothrix rhusiopathiae* and incubated at 37° C. for 48 hours. Formalin is added to kill organisms. An amount of the gel of Example 1 (4.675% suspension) was added equivalent to approximately 15% of the total culture media volume. The mixture was shaken for 30 minutes mechanically. The container with mixture was allowed to stand 48 hours whereupon the gel settled, removing the antigenic substances. This supernatant liquid was then decanted. The final product was homogenized and tested for potency and proved to be satisfactory in every way.

The gel likewise can be dried and admixed with other materials normally employed in tablet formulations and compressed into tablet form. The dried gel exhibits the property of absorbing water with swelling which in turn causes disintegration or breaking of the tablet when taken internally or used parenterally. The gel is dried for 24 to 48 hours (or to constant weight) at 110°–130° F.

A typical tablet formulation is:

| | Gms. |
|---|---|
| Phenothiazine | 12½ |
| Corn starch | 0.5 |
| Gel (of Example I dried to constant weight at 20° C.) | 0.5 |

Granulated with 1 gm. starch paste.

The gel can be used as an adjuvant and concentrating medium in the production of immunizing agents including vaccines or bacterins, such as *Erysipelathrix rhusiopathiae*, etc. These materials usually are primarily proteins but they need not be so. Media of proper formulations, e.g., agar, sugars, nutrient salts, meat extracts, etc., is inoculated with viable organisms and allowed to grow at the proper incubation temperatures for an optimum period to produce antigenicity in known manner. When growth has taken place, e.g., 24 to 48 hours, a preservative sterilizing agent, e.g., ¼% formalin or phenol is added to kill the live organisms. A prescribed amount of gel, e.g., normally 2% to 5% solids concentration, preferably 15% of a 3% solids concentration, is added to the media and thoroughly mixed or shaken to provide intimate contact between the gel and the antigenic materials. The gel is allowed to settle to the proper degree for the concentration desired. Generally, final concentration is dependent upon potency desired. Concentration can also be effected by mechanical means such as filtration or centrifugation.

To obtain the proper concentration supernatant liquid can be removed, added or adjusted to give the desired antigen strength. The product may be homogenized if desired to insure uniform suspension.

The gels are particularly effective in preparing pellet implants or suspensions whereby the immunizing agent will prolong immunity by providing longer contact between the antigen and tissue into which it is injected or implanted.

A slow release of the antigen from the pellet or suspension is obtained which results in the prolonged immunity. This slow release is accomplished since the pellets formed have only a very slight surface solubility. In suspensions, by its sorptive action, the gel will provide slow release of sorbed material, this prolonging action.

The antigen is concentrated with the tricalcium phosphate gel (or other gel) in the manner previously described. The concentrate of the gel and antigen is then placed in pans and lyophilized (dehydrated by freeze drying). The dried antigen is then combined with other materials such as calcium sulfate, shellac, aluminum monostearate, magnesium stearate, or other materials normally used in tablet manufacture, granulated and processed into pellets or implants.

Alternatively, the antigen can be dehydrated by lyophilization without the gel and the gel can be dried separately and then admixed with the antigen. Then other sorptive agents or fillers can be added if desired and the mixture granulated and compressed into pellets.

Specific examples are as follows:

*Example A*

| | Gms. |
|---|---|
| Erysipelas antigen (dried) | 6.0 |
| Tricalcium phosphate gel of Example 1 (dried) | 1.0 |
| Calcium sulfate | 8.0 |
| Aluminum monostearate | 1.0 |
| Shellac | 4.0 |

The mixture was granulated and then compressed into pellets.

Other formulas are as follows:

*Example B*

In Example A the 8 gms. of calcium sulfate is replaced by a mixture of 4 gms. calcium carbonate and 4 gms. calcium sulfate.

*Example C*

In Example A the 8 gms. of calcium sulfate is replaced by another excipient, namely, a mixture of 4 gms. lactose and 4 gms. calcium sulfate.

Other materials can be used alone or in combination with the gel to produce a pellet which has only a very slight surface solubility. Such materials include calcium carbonate, calcium sulfate, milk sugar, calcium oxide, etc. Preferably, however, the gel is included. The ratios of the materials will vary with the amount of antigen and the degree of hardness and insolubility desired.

*Example D*

| | Gms. |
|---|---|
| Erysipelas antigen (dried) | 4.0 |
| Calcium carbonate | 2.0 |
| Calcium sulfate | 1.0 |
| Shellac (25% solution in alcohol) | 2.0 |
| Aluminum monostearate | 0.5 |

The composition was granulated and compressed into pellets.

*Example E*

| | Gms. |
|---|---|
| Erysipelas antigen (dried) | .6 |
| Calcium carbonate | 1 |
| Calcium sulfate | 8 |
| Aluminum monostearate | 1 |
| Shellac | 4 |

The composition was granulated and compressed into pellets.

The tricalcium phosphate gel is also an excellent suspending agent and vehicle for inclusion in suspension-type products where it is advantageous to include insoluble solids among the active ingredients, and also has anti-acid properties which make it a vehicle as well as an active ingredient in scour products for veterinary use and stomachic-intestinal products for human or veterinary use.

Typical scour formulations are:

Combination of sulfa drugs, kaolin, pectin, sodium thiosulfate, etc., in an aqueous suspension of gel in 2% to 14% concentration, depending upon quantities of solids present.

Typical stomachic-intestinal formulations are:

| | Grains |
|---|---|
| Calcium phosphate gel of Example 1 | 6 |
| Magnesium trisilicate | 9 | containing aromatics, flavoring agents in aqueous suspension.

Unless otherwise stated, all parts and percentages are by weight.

We claim:

1. A method of preparing a hydrated calcium phosphate gel free of $CaHPO_4$ comprising admixing an aqueous acid solution of a calcium salt with an aqueous alkaline solution of a phosphate, the ratio of the calcium ions to phosphate ions being approximately 10 to 6, the alkaline solution being of sufficient strength that after mixing with said acid solution the over-all pH is at least about 9, and recovering said gel.

2. A method of preparing a hydrated calcium phosphate gel free of $CaHPO_4$ comprising admixing an aqueous acid solution of a calcium salt with aqueous ammonium phosphate in the presence of sufficient excess ammonia to render the mixture alkaline to a pH of at least about 9, the ratio of calcium ions to phosphate ions being approximately 10 to 6, and recovering the hydrated calcium phosphate gel.

3. A method of preparing a hydrated calcium phosphate gel free of $CaHPO_4$ comprising dissolving calcium carbonate in aqueous acid solution, removing the carbon dioxide formed and adding ammonium phosphate in the presence of sufficient excess of ammonia that the pH is at least about 9, the ratio of the calcium ions to phosphate ions being approximately 10 to 6, and recovering the hydrated calcium phosphate gel.

4. A method according to claim 3 wherein the acid selected from the group consisting of lactic acid, acetic acid, malic acid and fumaric acid is an organic acid.

5. A method according to claim 4 wherein the organic acid is lactic acid.

6. A method of preparing a hydrated calcium phosphate gel free of $CaHPO_4$ comprising dissolving calcium carbonate in aqueous lactic acid solution, boiling the solution to remove the carbon dioxide formed, adding a mixture of phosphoric acid and ammonium hydroxide having a pH of about 9 with stirring, the ratio of calcium carbonate to phosphoric acid being approximately 10 to 6, allowing the suspension to stand, removing the excess liquid to form a cake and washing the wet cake with water until ammonia free, and recovernig the hydrated calcium phosphate gel.

References Cited in the file of this patent

UNITED STATES PATENTS

| 2,555,656 | Plusje et al. | June 5, 1951 |
| 2,605,229 | Marcus | July 29, 1952 |